US006297896B1

(12) United States Patent
Kikuchi et al.

(10) Patent No.: US 6,297,896 B1
(45) Date of Patent: Oct. 2, 2001

(54) OPTICAL SWITCH AND OPTICAL COMMUNICATION SYSTEM USING THE SAME

(75) Inventors: Kimihiro Kikuchi; Atsunori Hattori, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/334,526

(22) Filed: Jun. 16, 1999

(30) Foreign Application Priority Data

Jun. 18, 1998 (JP) .................................................. 10-170963

(51) Int. Cl.⁷ .............................. H04J 14/02; G02B 6/35
(52) U.S. Cl. ................................. 359/128; 385/19; 385/47
(58) Field of Search .................................... 359/173, 179, 359/128; 385/19, 23, 47

(56) References Cited

U.S. PATENT DOCUMENTS

| 4,707,057 | 11/1987 | Takahashi et al. | 350/96.12 |
| 5,077,813 | 12/1991 | Dorsel et al. | 385/19 |
| 5,589,933 | 12/1996 | Osgood et al. | 356/73.1 |
| 5,652,814 | 7/1997 | Pan et al. | 385/24 |
| 6,061,484 | * 5/2000 | Jones et al. | 385/24 |
| 6,115,517 | * 9/2000 | Shiragaki et al. | 385/24 |

FOREIGN PATENT DOCUMENTS

| 60/060620 | 4/1985 | (EP) . |
| 60/133407 | 7/1985 | (EP) . |
| 0 973 054 A2 | 1/2000 | (EP) . |

* cited by examiner

*Primary Examiner*—Jason Chan
*Assistant Examiner*—Christina Y. Leung
(74) *Attorney, Agent, or Firm*—Brinks Hofer Gilson & Lione

(57) ABSTRACT

The optical communication system comprises at least one transmitter provided with a light source for emitting white light having a wide wavelength band, an optical fiber for transmitting white light emitted from the light source and at least one optical switch placed along the optical fiber, and at least one receiver. The optical switch has an optical filter for selectively splitting predetermined different wavelengths and reflecting other wavelengths, and a switching device for cutting off or passing lights of the wavelengths split by the optical filter. An optical filter merges light transmitted by the switching device with lights of other wavelengths reflected by the optical filter and transmits it to the optical fiber.

4 Claims, 3 Drawing Sheets

2

OPTICAL SWITCH AND OPTICAL COMMUNICATION SYSTEM USING THE SAME

BACKGROUND OF THE INVENTION

1. Field of the Invention

The present invention relates to an optical switch for transmitting optical signals and detecting a specific signal and an optical communication system using the optical switch.

2. Description of the Related Art

As an alternative to a telecommunication system for transmitting electric signals, an optical communication system using an optical fiber has recently been put into practical use with a view toward achieving prevention of electromagnetic noise, an increase in transfer capacity, a weight reduction in system, simplification of work, etc.

FIG. 5 is a block diagram showing a conventional optical communication device employed in such a system. This is equivalent to an optical communication system wherein a light-emitting unit 1 is electrically turned on/off to thereby transmit such on/off information to a photo-detector 3 through an optical fiber 2. The light-emitting unit 1 has a light-emitting device 1a comprised of an LED or the like for converting an electric signal into an optical signal, a switch 1b for turning on/off the light-emitting device 1a according to information [1]and [0], and a lens 1c for focusing light emitted from the light-emitting device 1a on an end surface of the optical fiber 2. An electrical switch is used as the switch 1b.

In the optical communication system constructed in this way, the switch 1b performs switching at high speed when an optical signal is subjected to time sharing, followed by transmission from one light-emitting unit 1 to a plurality of photo-detectors 3 on a time-sharing basis. When optical signals are transmitted from a plurality of light-emitting units 1 to a plurality of photo-detectors 3 in a one-to-one correspondence, the plurality of light-emitting units 1 and the plurality of photo-detectors 3 respectively having selectivity with respect to wavelengths λ1, . . . λn are placed on the optical fiber 2 in a one-to-one correspondence by their wavelength multiplexing.

As such an optical communication system, there is known a system for monitoring or supervising the operations of a plurality of switching devices employed in an automatic vending machine, a plant, etc. or the operations of a plurality of door switches for automobiles.

However, the above-described optical communication system has a problem in that since the light-emitting device 1a in the light-emitting unit 1 on the transmitting side is turned on and off by the switch 1b to generate the optical signal, the life of the light-emitting device la becomes short and the system is low in reliability.

Another problem also arises in that since there is need to supply power to the light-emitting device 1a of the light-emitting unit 1 on the transmitting side, it is necessary to place a power line in the same place in addition to the optical fiber 2, so that the optical communication system cannot take full advantage of their merits such as a weight reduction in system and simplification of work, whereby the optical communication system cannot be applied to a system required at a location placed under hostile environmental conditions apt to cause an explosion or the like.

SUMMARY OF THE INVENTION

A first arrangment for solving the above problems, there is provided an optical switch, comprising within a case:

a first optical guide path;

a second optical guide path which branches off from the first optical guide path and leads to the first optical guide path again;

optical filters placed in a branching point and an introducing point of the first optical guide path; and a switching device for cutting off light introduced into the second optical guide path or allowing the light to pass therethrough, whereby the optical filters pass or reflect light having a predetermined wavelength band and reflect or pass lights having other wavelength bands, so that the light having the predetermined wavelength band introduced into the second optical guide path is selectively combined or merged with the lights having other wavelength bands at the introducing point by the switching device.

Further, as second solving arrangement, there is provided an optical switch wherein optical filters for reflecting light having a predetermined wavelength band, which are identical to the optical filters placed in the branching point and introducing point of the first optical guide path, are interposed in the second optical guide path to thereby bend the light at the right angle.

Moreover, as third solving arrangment, there is provided an optical communication system, comprising:

a light source for emitting light having a wide wavelength band;

an optical fiber for transmitting the light emitted from the light source;

a plurality of optical switches placed in a one-to-one correspondence along the optical fiber; and a plurality of receivers;

the plurality of receivers respectively including optical filters for selectively splitting light having a predetermined wavelength band of the wide wavelength band transmitted through the optical fiber and the plurality of optical switches, and photo-detectors for respectively detecting the light of wavelengths split by the optical filters.

Typical ones of the present invention have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described with reference to the accompanying drawings.

Figure 1:
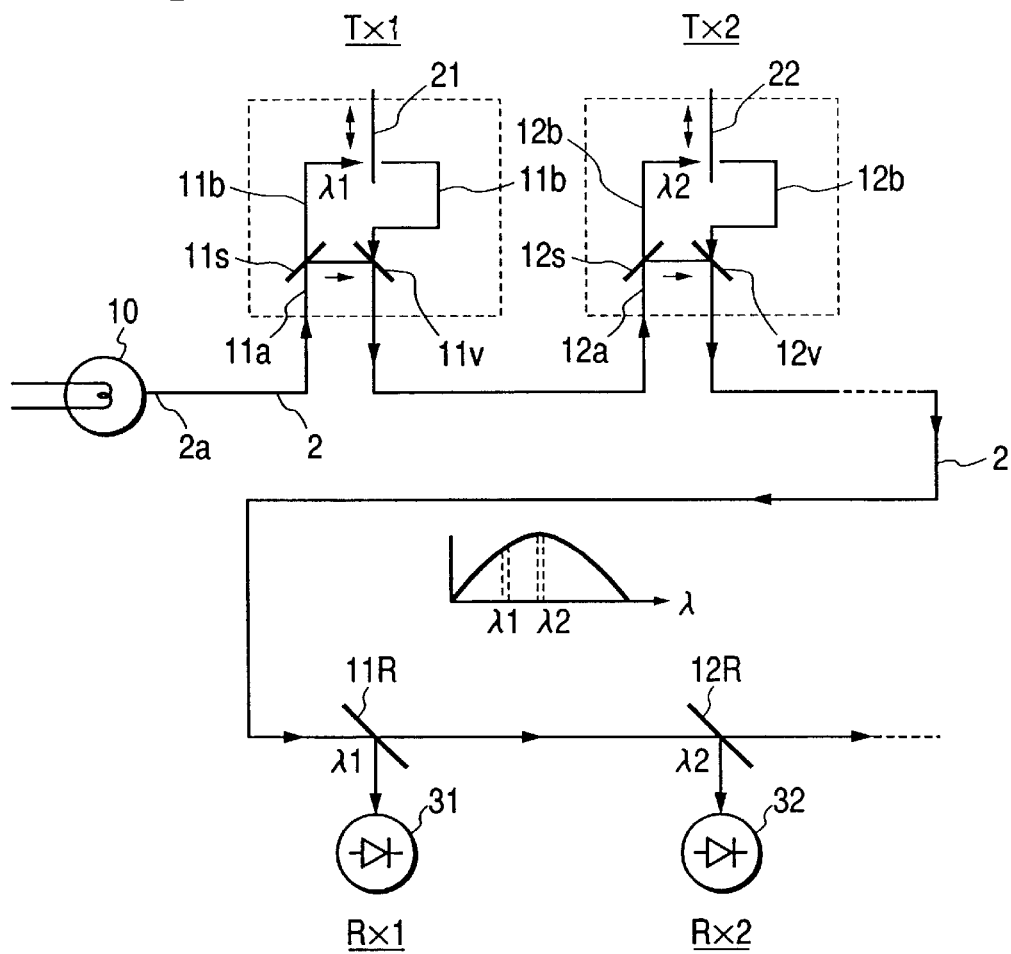
FIG. 1 is a configurational diagram of an optical communication system showing a first embodiment of the present invention.

FIG. 1 shows a basic structure of an optical communication system according to the present invention.

As shown in FIG. 1, a light source 10 for emitting light having a wide wavelength band therefrom comprises a white light source. The light emitted from the light source 10 is concentrated onto and launched into an end surface 2a of an optical fiber 2 through an unillustrated lens and transmitted along the optical fiber 2. A plurality of transmitters Tx1, Tx2, . . . Txn and a plurality of receivers Rx1, Rx2, . . . Rxn respectively having selectivity with respect to wavelengths $\lambda 1, \lambda 2, \ldots \lambda n$ are disposed on an optical path of the optical fiber 2 so that they are respectively held in a one-to-one correspondence with one another.

While only the two pairs of transmitters Tx1 and Tx2 and receivers Rx1 and Rx2 are shown in FIG. 1 for simplification of illustration, the transmitters Txn and receivers Rxn greater than the two pairs are actually disposed in a one-to-one correspondence along the optical fiber 2.

The transmitters Tx1 and Tx2 respectively have first optical guide paths 11a and 12a for guiding light having a wide wavelength band on the optical fiber 2, optical filters 11S and 12S which respectively selectively split and pass light of wavelengths $\lambda 1$ and $\lambda 2$, of the light and reflect other wavelengths therefrom, and second optical guide paths 11b and 12b for introducing the light of wavelengths $\lambda 1$ and $\lambda 2$ transmitted through the optical filters 11S and 12S into switching devices, i.e., mechanical switches 21 and 22, respectively. The mechanical switches 21 and 22 cut off or pass the light of wavelengths $\lambda 1$ and $\lambda 2$ introduced through the second optical guide paths 11b and 12b manually or under external mechanical on/off operation.

Further, the lights of wavelengths $\lambda 1$ and $\lambda 2$ transmitted through the mechanical switches 21 and 22 are respectively introduced into and transmitted through optical filters 11V and 12V through the second optical guide paths 11b and 12b. Thereafter, they are merged or combined with light of other wavelengths reflected from the optical filters 11S and 12S and further from the optical filters 11V and 12V.

The receivers Rx1 and Rx2 respectively corresponding to the transmitters Tx1 and Tx2 have optical filters 11R and 12R which similarly selectively reflect the light of wavelengths $\lambda 1$ and $\lambda 2$, of the light having the wide wavelength band on the optical fiber 2 and pass other wavelengths therethrough, and light-detecting devices or photo-detectors 31 and 32 for detecting the light of wavelengths $\lambda 1$ and $\lambda 2$ reflected by the optical filters 11R and 12R, respectively.

In the optical communication system constructed in this way, the light source 10 always stays on when a system is in operation. When the mechanical switch 21 in the transmitter Tx1 is turned on, for example, the light of wavelength $\lambda 1$ split and passed by the optical filter 11S is transmitted by the mechanical switch 21 without being cut off thereby and thereafter merged with the light of other wavelengths reflected from the optical filter 11S by the optical filter 11V. Thus, the wide wavelength band of the light source 10 is transmitted to the receivers Rx1 and Rx2 through the transmitter Tx2 provided at the subsequent stage as it is.

On the other hand, when the switch 21 is tuned off, the light of wavelength $\lambda 1$ split and transmitted by the optical filter 11S is cut off by the switch 21. Accordingly, light exclusive of the light of wavelength $\lambda 1$, of the light having the wide wavelength band of the light source 10 is transmitted to the receivers Rx1 and Rx2 through the transmitter Tx2 provided at the subsequent stage.

In the receiver Rx1, the light of wavelength $\lambda 1$ reflected by the optical filter 11R is to be detected by the photo-detector 31. However, when the switch 21 is held off, the photo-detector 31 does not detect the light of wavelength $\lambda 1$.

Since the light of wavelength $\lambda 2$ reflected by the optical filter 12R is detected by the photo-detector 32 in the receiver Rx2 provided at a stage next to the receiver Rx1, it is not affected by the turning off and on of the switch 21 in the transmitter Tx1. Thus, when the switch 22 of the transmitter Tx2 corresponding to the receiver Rx2 is turned on, the receiver Rx2 receives the light of wavelength $\lambda 2$. On the other hand, when the switch 22 is turned off, the receiver Rx2 does not receive the light of wavelength $\lambda 2$.

A first embodiment in which such an optical communication system according to the present invention is embodied, will be explained below with reference to FIG. 2 and FIGS. 3A and 3B.

Figure 2:
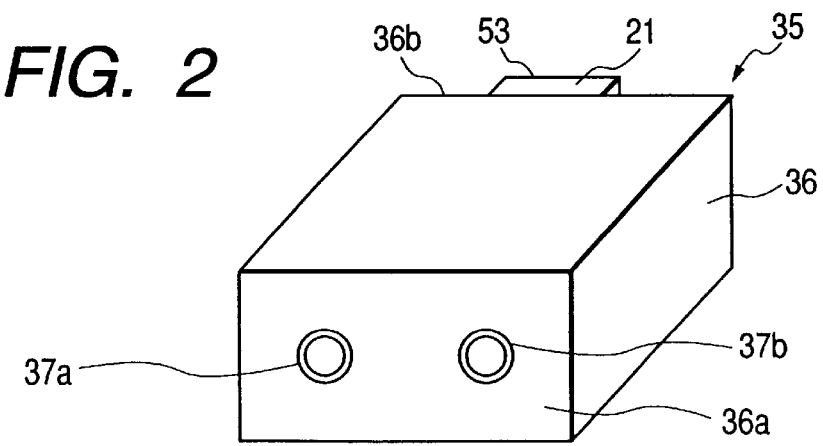
FIG. 2 is a perspective view illustrating an optical switch according to the present invention.

FIG. 2 is a perspective view showing the transmitter Tx1 of the optical communication system according to the present invention, i.e., the optical switch 35. FIG. 3A shows an off state of the optical switch 35 employed in the optical communication system of the present invention. FIG. 3B illustrates an on state of the optical switch 35. While only the respective one transmitters Tx1 (optical switch 35) and the respective one receivers Rx1 are electrically connected to their corresponding optical fibers 2 in FIGS. 3A and 3B, they are respectively comprised of a plurality of modules.

As shown in FIG. 2, the optical switch 35 is constructed in such a manner that a box-shaped case 36 composed of a resin has opposite side walls 36a and 36b, connecting portions 37a and 37b for connecting the optical fiber 2 thereto are formed on one side wall 36a and a mechanical switch 21 provided with a stem 53 which is capable of being taken in and out and movable, is provided on the other side wall 36b side.

Figure 3A:
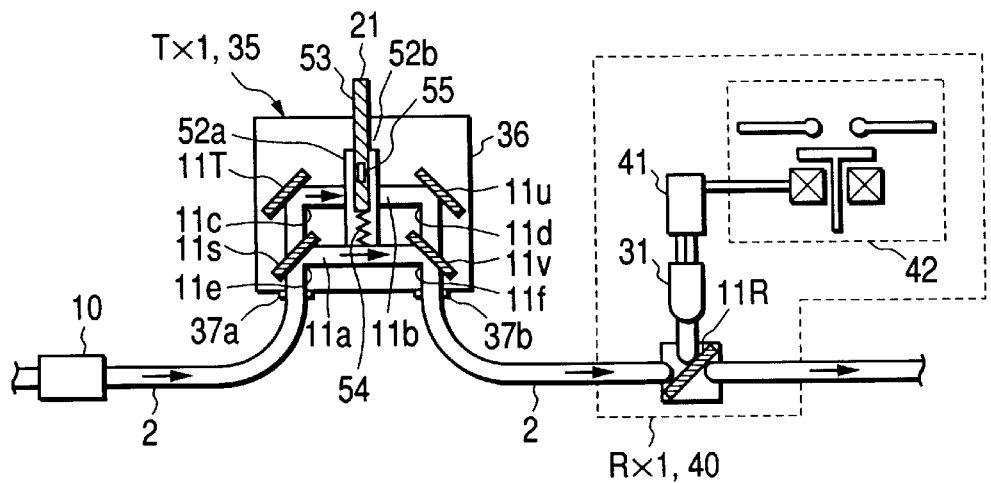
FIG. 3A shows an off state of the optical switch of the optical communication system according to the present invention.
Figure 3B:
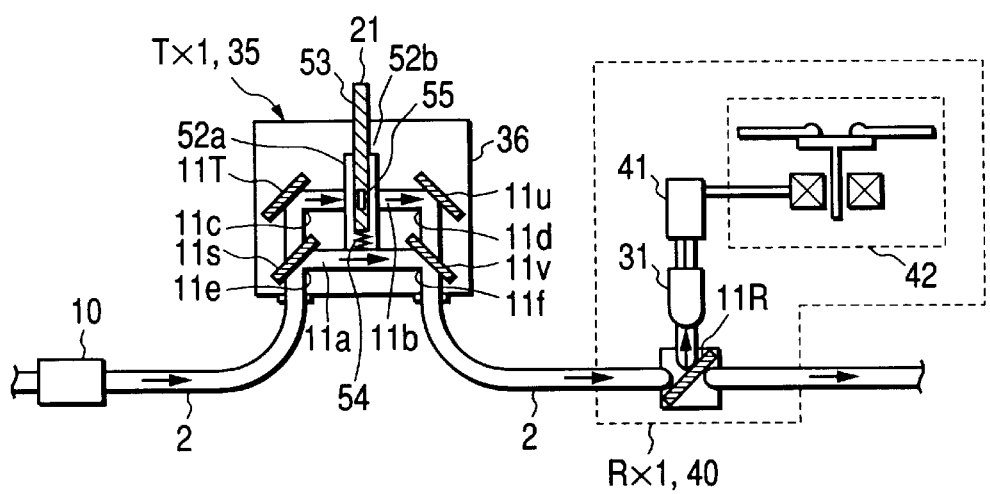
FIG. 3B illustrates an on state of the optical switch thereof.

Further, the optical switch 35 is provided within a case 36 with a U-shaped first optical guide path 11a connected to the connecting portion 37a and a U-shaped second optical guide path 11b which branches off from the optical guide path 11a, as shown in FIGS. 3A and 3B. Moreover, a first optical filter 11S and a second optical filter 11V are respectively provided at their corresponding turned-out or junction portions 11e (defined as a diverging or branching point) and 11f (introduction point).

The first and second optical filters 11S and 11V are respectively flat branching filters and pass therethrough light of wavelengths lying in a given special frequency band, of incident light and reflect the other lights therefrom. Each optical filter is attached and fixed at an angle of about 45° to the incident light and outputs or carries the light at an angle of 90° to the incident light of wavelength other than in the special frequency band.

The second optical guide path 11b has bent portions 11c and 11d bent at right angles. Flat reflecting mirrors 11T and 11U each attached and fixed at an angle of 45° to the incident light are provided at the bent portions 11c and 11d respectively.

Further, a mechanical switch 21 is placed in the second optical guide path 11b so as to separate or divide a midway point of the second optical guide path 11b into two.

The mechanical switch 21 comprises a resin-made or metallic cylindrical stem 53 which reciprocatively projects from an opening 52b defined in the case 36 so as to cut the second optical guide path 11b to the outside, and a resin-made or coil-shaped metal spring 54 provided between the leading end of the stem 53 and the bottom wall of the opening 52b. Further, a window 55 for allowing light to pass therethrough is defined in a part of the stem 53. This window 55 is normally placed in a position (i.e., at the time that the mechanical switch 21 is in an off state) out of the second optical guide path 11b.

When the stem 53 is pressed against the spring 54 (i.e., when the mechanical switch 21 is held in the on state), the window 55 moves to a position opposite to the second optical guide path 11b so that the light launched into the second optical guide path 11b is sent or carried to the reflecting mirror 11U through the window 55.

Thus, the mechanical switch 21 performs switching to optical screening or cutting off and transmission as an alternative to an electrical on/off connection as compared with the normal switch.

A receiver 40 corresponds to the above-described receiver Rx1 and is provided with a photo-detector 31 for converting light having a given special wavelength band into an electric signal, a signal processor 41 for shaping the electric signal into a predetermined waveform, a driver 42 driven according to on/off or the like of the waveform-shaped signal, e.g., a relay switch, and an air valve activated by the relay switch.

In the optical communication system using the optical switch 35 constructed in this way, white light having a wide wavelength band, which is emitted from the light source 10, passes through the optical fiber 2 so as to be introduced therein through the connecting portion 37a.

The white light transmitted through the first optical guide path 11a coupled to the connecting portion 37a, e.g., only blue light having a wavelength (about 470 nm) band is transmitted by the first optical filter 11S, whereas lights having other wavelength bands are reflected by the first optical filter 11S.

The blue light with the above wavelength band, which has been transmitted through the first optical filter 11S, passes through the second optical guide path 11b and is reflected by the reflecting mirror 11T so that it is bent at the right angle.

When the mechanical switch 21 shown in FIG. 3A is in the off state, i.e., the stem 53 is not pressed, the blue light is blocked by the wall of the stem 53 so that it does not reach the reflecting mirror 11U shown in the drawing.

Accordingly, each light transmitted through the first optical guide path 11a, excluding the blue light with the above wavelength band is reflected at the right angle by the second optical filter 11V, followed by transmission to the optical fiber 2 through the connecting portion 37b.

The lights transmitted through the optical fiber 2, excluding the blue light are launched into the receiver 40. In the receiver 40, the lights excluding the blue light are not reflected into a photo-detector 31 by an optical filter 11R for passing other wavelengths therethrough but are all passed toward the optical fiber 2 provided on the back side of the optical filter 11R.

Thus, since the photo-detector 31 of the receiver 40 does not detect the light, no driver 42 is activated. Therefore, for example, the relay switch is maintained in an off state and the air valve activated by the relay switch remains closed.

Incidentally, the optical filter 11S and the optical filter 11R make use of those identical in filter characteristic to each other respectively.

When a mechanical switch 21 shown in FIG. 3B is now turned on, i.e., a stem 53 is pressed, a window 55 of the mechanical switch 21 is placed between separated second optical guide paths 11b against a spring 54. Therefore, incident blue light passes through the window 55 and is orthogonally bent by a reflecting mirror 11U, followed by falling on a second optical filter 11V.

The second optical filter 11V transmits white light obtained by merging bluelight-free light transmitted through a first optical guide path 11a with the blue light to an optical fiber 2 through a connecting portion 37b.

The white light including the blue light, which has passed through the optical fiber 2, is launched into a receiver 40. In the receiver 40, the blue light of the white light including the blue light is reflected into a photo-detector 31 by an optical filter 11R, whereas lights having other wavelengths are transmitted through the optical fiber 2 provided on the back side of the optical fiber 11R.

Further, the blue light is converted into an electric signal by the photo-detector 31, which in turn is suitably waveform-shaped by a signal processor 41. Thus, a relay switch used as a driver 42 is turned on so that an air valve is opened by a motor connected to the relay switch.

In the optical communication system provided with the optical switch 35 constructed in this way, the optical filter 11S passes only light of a given special wavelength therethrough and reflects light of other wavelengths to branch or split off, whereby on/off switching corresponding to the light of special wavelength can be constructed, thereby making it possible to eliminate the need for electrical wires or cables large in transmission loss. Further, since a common light source is used, each individual signal generating power supplies are made unnecessary, so that the system can be reduced in weight and its work can be simplified. Along with their achievement, a plurality of optical switches 35 corresponding to a given predetermined wavelength band can be prepared for their driver 42 so that their operations can be performed at a remote place. Therefore, this is particularly effective in operating the driver 42 even under environments of unfavorable conditions hazardous to humans.

Further, since an optical signal is generated by light transmission or blocking without using electrical contacts, the optical communication system can be applied even under a hostile environment which is likely to cause an explosion.

Since optical signals whose wavelengths are multiplexed, are transmitted according to combinations of a plurality of optical switches 35 and receivers provided in a one-to-one correspondence to the optical switches, a plurality of drivers 42 can be controlled.

Further, a common light source may stay lit up without turning each individual light sources on and off according to signals as in the conventional optical communication system, thus making it possible to increase the life of each light source and improve reliability.

Figure 4:
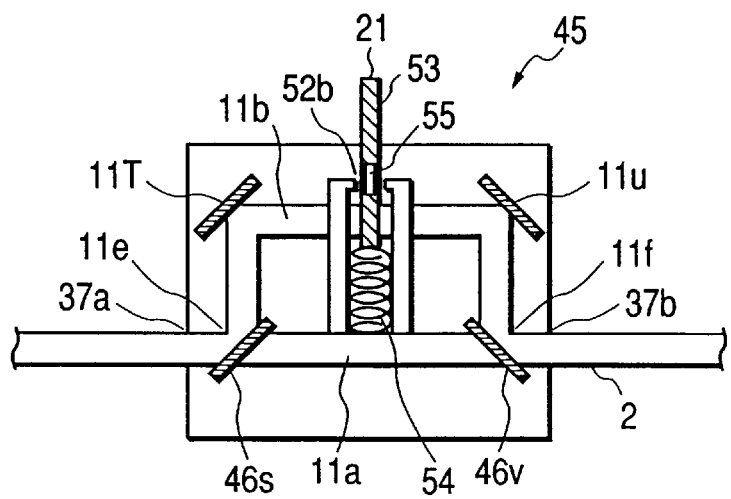
FIG. 4 is a cross-sectional view of an optical switch showing a second embodiment of the present invention.
Figure 5:
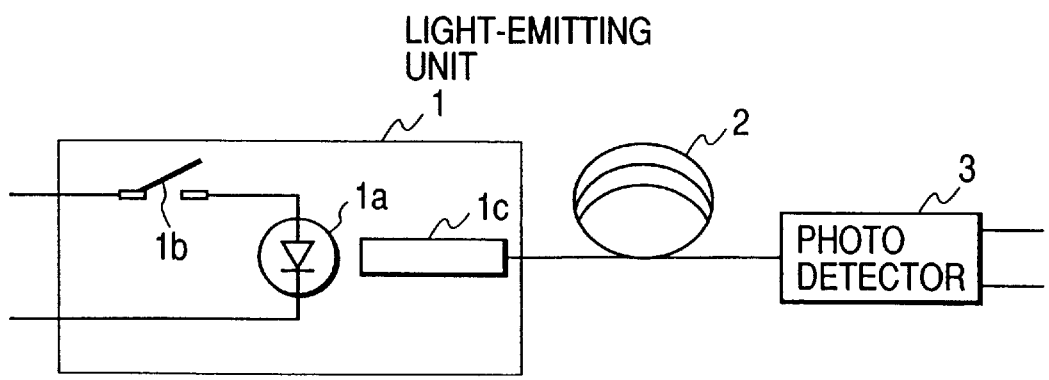
FIG. 5 is a block diagram showing a conventional optical communication system.

A description will next be made of an optical switch 45 showing a second embodiment of the present invention, which is shown in FIG. 4.

As shown in FIG. 4, the optical switch 45 makes use of a first optical filter 46S and a second optical filter 46V for reflecting the light of a predetermined wavelength and passing other lights respectively as an alternative to the transmission first and second optical filters 11S and 11V for passing the light of the predetermined wavelength therethrough, which have been described in the optical switch 35. Further, connecting portions 37a and 37b for connecting an optical fiber 2 thereto are provided so as to be in line with both walls of a case. Accordingly, a first optical guide path 11a can be linearly formed.

Thus, light having a wide wavelength band, which is incident from the connecting portion 37a of the optical switch 45 through the optical fiber 2, e.g., a blue light is reflected by the first optical filter 46S, followed by launching into a second optical guide path 11b. Lights having other wavelength bands are transmitted through the first optical filter 46S so as to be launched into the first optical guide path 11a. The lights having the other wavelength bans pass through the first optical guide path 11a so as to fall on the second optical filter 46V. On the other hand, when the blue light passes through the second optical guide path 11b and a mechanical switch 21 is held on, the blue light is launched into the second optical filter 46V through reflecting mirrors 11. Light having a wavelength band other than that for the blue light is transmitted by the second optical filter 46V and the blue light is reflected by the second optical filter 46V, so that they are merged into one. As described above, the merged or combined light is detected by a receiver 40 for reflecting only the blue light to activate a driver 42.

When the mechanical switch 21 is held in an off state, the optical switch 45 is activated under the same operation as that for the above-described optical switch 35.

Here, the optical filters 46S and 46V, which constitute an optical communication system, are respectively reflection type optical filters having the same characteristic, which reflect light of a specific wavelength. Further, the two reflecting mirrors 11T and 11U placed in the second optical guide path 11b may be constructed of the reflection type optical filters 46S and 46V. In doing so, the respective parts such as the optical filters can be used in common.

The optical communication system constructed in this way is provided with the optical filter 46S for selectively reflecting light having a predetermined wavelength band into the first optical guide path 11a of the optical switch 45, and the mechanical switch 21 for screening or passing light split by the optical filter 46S. Further, the mechanical switch 21 selectively changes and determines whether the light having the predetermined wavelength band is combined with other light according to its operation or it is carried through the second optical filter 46V while it remains omitted. Therefore, an optical switch according to light-produced colors of respective wavelengths can be obtained.

Since the optical fiber 2 is placed in line with the case 36, workability is good upon its attachment and wires for a plurality of optical fibers 2 can be placed at good spaces.

Incidentally, the optical switch according to the present invention is not necessarily limited to the aforementioned embodiments.

An optical switch according to the present invention is provided within a case with a first optical guide path, a second optical guide path which branches off from the first optical guide path and leads to the first optical guide path again, optical filters respectively placed in a branching or junction point and an introducing point of the first optical guide path, and an open/close or switching device for blocking or passing light introduced into the second optical guide path. The optical filters pass or reflect light having a predetermined wavelength band and reflect or pass lights having other wavelength bands, so that the light having the predetermined wavelength band introduced into the second optical guide path is selectively merged or combined with the lights having other wavelength bands at the introducing point by the switching device. Thus, since an optical switch corresponding to light-produced colors of respective wavelengths can be obtained without shortening the life of a light source even if the switching device is turned on and off, high reliability can be obtained as a system.

Further, optical filters for reflecting light having a predetermined wavelength band, which are identical to the optical filters placed in the branching point and introducing point of the first optical guide path, are interposed in the second optical guide path to thereby bend the light at the right angle. As a result, parts can be used in common and an optical switch excellent in space factor can be configured.

An optical communication system using an optical switch according to the present invention comprises a light source for emitting light having a wide wavelength band, an optical fiber for transmitting the light emitted from the light source, a plurality of optical switches placed in a one-to-one correspondence along the optical fiber, and a plurality of receivers. In the optical communication system, the plurality of receivers respectively have optical filters for respectively selectively splitting light having a predetermined wavelength band in the wide wavelength band transmitted through the optical fibers and the plurality of optical switches, and photo-detectors for respectively detecting the lights split by the optical filters, thereby bringing the light into wavelength multiplex form. Therefore, the common light source is not turned on and off according to a signal and may stay lit up. Further, the life of the light source can be extended and hence the reliability of the optical communication system can be improved. The cutting off or transmission of the light of the light source by a manual open/close or switching device on the transmitting side eliminates the need for a power line for generating optical signals and makes it possible to bring a system into less weight and simplify work.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An optical switch, comprising within a case:

a first optical guide path;

a second optical guide path which branches off from the first optical guide path and leads to the first optical guide path again;

optical filters placed in a branching point and an introducing point of said first optical guide path, the optical filters attached to the case; and a switching device to cut off light introduced into said second optical guide path or allow the light to pass therethrough, the case having an opening through which the switching device projects to cut off the light introduced into the second optical guide path, the switching device having:

a stem of which a part reciprocally projects through the opening to an exterior of the case, the stem having a window to allow light to pass therethrough when the stem is in an on position, the stem to selectively allow light introduced into the second optical guide path to pass therethrough depending on whether the window is disposed in the second optical guide path, the stem having an off position in which the window is not disposed in the second optical guide path, the stem being in the off position when unactuated; and a spring member to return the stem to the off position from the on position, whereby said optical filters pass or reflect light having a predetermined wavelength band and reflect or pass lights having other wavelength bands, the optical filters disposed in the branching point of the first optical guide path guiding light having the predetermined wavelength band from incident light having a wide wavelength band to the second optical guide path and introducing lights having other wavelength bands to the first optical guide path and the optical filter fixed and disposed in the introducing point of the first optical guide path merging light having the predetermined wavelength band that has been selectively allowed to pass therethrough by the switching device with the lights having other wavelength bands.

2. The optical switch according to claim 1, wherein optical filters for reflecting light having a predetermined wavelength band, which are identical to said optical filters placed in the branching point and introducing point of said first optical guide path, are interposed in said second optical guide path to thereby bend the light at the right angle.

3. An optical communication system, comprising:
a light source to emit light having a wide wavelength band at all times;
an optical fiber to transmit the light emitted from said light source;
a plurality of optical switches placed in a one-to-one correspondence along said optical fiber; and
a plurality of receivers;
said plurality of receivers respectively including optical filters to respectively selectively split light having a predetermined wavelength band of the wide wavelength band transmitted through said optical fiber and said plurality of optical switches, and photo-detectors to respectively detect the light of wavelengths split by said optical filters,
said each optical switch comprising in a case:
a first optical guide path;
a second optical guide path which branches off from the first optical guide path and leads to the first optical guide path again;
optical filters placed in a branching point and an introducing point of said first optical guide path, the optical filters attached to the case; and
a switching device to cut off light introduced into said second optical guide path or allow the light to pass therethrough, the case having an opening through which the switching device projects to cut off the light introduced into the second optical guide path, the switching device having:
a stem of which a part reciprocally projects through the opening to an exterior of the case, the stem having a window to allow light to pass therethrough when the stem is in an on position, the stem to selectively allow light introduced into the second optical guide path to pass therethrough depending on whether the window is disposed in the second optical guide path, the stem having an off position in which the window is not disposed in the second optical guide path, the stem being in the off position when unactuated; and
a spring member to return the stem to the off position from the on position,
whereby said optical filters pass or reflect light having a predetermined wavelength band and reflect or pass lights having other wavelength bands, the optical filters disposed in the branching point of the first optical guide path guiding light having the predetermined wavelength band from incident light having the wide wavelength band to the second optical guide path and introducing lights having other wavelength bands to the first optical guide path and the optical filter fixed and disposed in the introducing point of the first optical guide path merging light having the predetermined wavelength band that has been selectively allowed to pass therethrough by the switching device with the lights having other wavelength bands.

4. The optical switch according to claim 3, wherein optical filters for reflecting light have a predetermined wavelength band, which are identical to said optical filters placed in the branching point and introducing point of said first optical guide path, are interposed in said second optical guide path to thereby bend the light at the right angle.

* * * * *